United States Patent [19]

Hammond et al.

[11] 4,080,629
[45] Mar. 21, 1978

[54] CAMERA AND HOUSING

[75] Inventors: George Glover Hammond; Peter Thomas Alleyne Goddard, both of Shepperton, England

[73] Assignee: Photo-Scan Limited, England

[21] Appl. No.: 698,343

[22] Filed: Jun. 22, 1976

Related U.S. Application Data

[63] Continuation-in-part of Ser. No. 588,502, Jun. 19, 1975, abandoned.

[30] Foreign Application Priority Data

Nov. 11, 1974 United Kingdom ............ 48696/74

[51] Int. Cl.² ............................................. H04N 7/18
[52] U.S. Cl. ................................. 358/229; 358/108; 358/210; 352/242; 352/243
[58] Field of Search ............... 358/108, 210, 229; 352/242, 243

[56] References Cited

U.S. PATENT DOCUMENTS

| | | | |
|---|---|---|---|
| 3,732,368 | 5/1973 | Mahlab | 358/108 |
| 3,739,703 | 6/1973 | Behles | 358/108 |
| 3,819,856 | 6/1974 | Pearl | 358/108 |
| 3,935,380 | 1/1976 | Coutta | 358/108 |

Primary Examiner—Howard W. Britton
Attorney, Agent, or Firm—Birch, Stewart, Kolasch and Birch

[57] ABSTRACT

A surveillance television camera on pan and tilt mountings is concealed in a housing which has dummy lenses arranged to suggest that the camera has all-round vision. The housing also has at least one shiny window through which the camera can view. Behind the window the camera and its surroundings are matt black so that the orientation of the camera cannot be seen from outside the housing.

13 Claims, 6 Drawing Figures

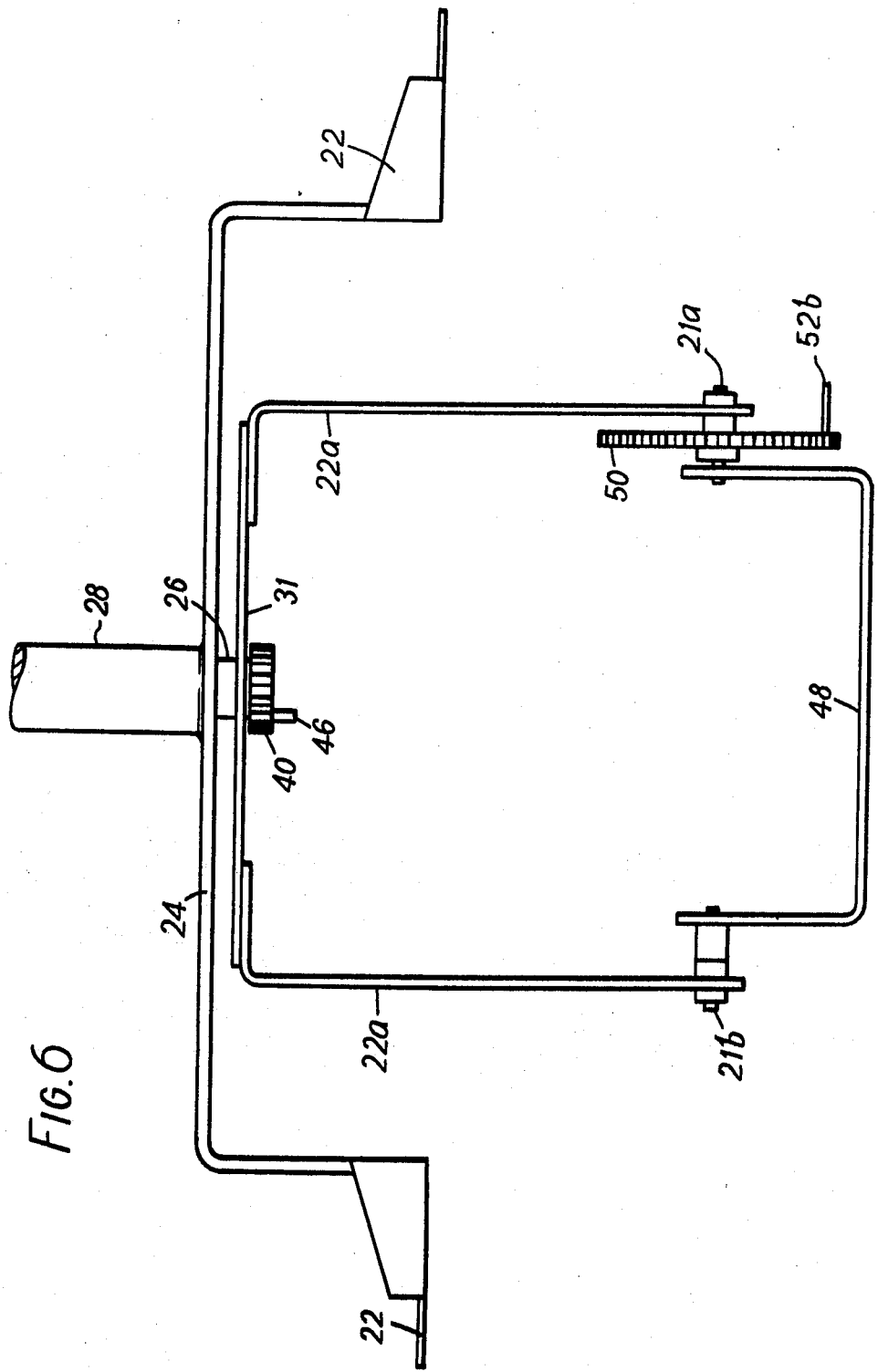

CAMERA AND HOUSING

This application is a Continuation-in-Part application of U.S. application Ser. No. 588,502, filed on June 19, 1975, now abandoned.

FIELD OF THE INVENTION

The present invention relates to cameras for television surveillance, for example for security purposes. Such cameras are mounted at a vantage point, such as on a ceiling, from which a surveillance zone may be seen.

DESCRIPTION OF THE PRIOR ART

A known system of this type provides a camera with pan, tilt and zoom mechanisms. However, the camera and its orientation may be seen by persons in the surveillance zone, who are thus able to judge whether they are within its field of view.

A known alternative arrangement provides a camera obscured in a suspended housing, which carries a number of dummy lenses and one operative camera lens, all of which look alike. The camera is fixed within the housing, and views through the operative lens. The housing may rotate to pan the camera but the camera cannot tilt. An example of such a system is disclosed in U.S. Pat. No. 3,535,442 issued to John E. Jennings, Oct. 20, 1970.

This arrangement gives to persons in the surveillance zone the appearance of apparatus providing all-round camera vision, and may therefore deter them from crime, even although the camera actually views in only one direction at a time.

In U.S. Pat. No. 3,732,368 issued to Salim S. Mahlab, May 8, 1973, the housing and camera fixedly mounted therein can also tilt but the tilting of the whole housing results in a somewhat clumsy arrangement which inevitibly gives would-be thieves considerable information as to the direction in which the camera is looking.

It is desirable to provide a visible and crime-deterrent housing with a camera which is able to range even more freely so as to cover a greater surveillance zone, but which is such that persons in the surveillance zone cannot detect that they are not in the field of view of the camera. This cannot be achieved with known systems such as that of the Jennings Patent where the camera is forced to look along a single direction relative to the housing. Another problem with known systems is the difficulty of achieving zoom operation when the camera views through a lens mounted on the housing and forming a fixed front element of the camera lens.

U.S. Pat. No. 3,819,856, issued June 25, 1974, provides a camera which can pan, tilt and zoom inside a fixed, hemispherical housing which is specially coated so as to make it difficult for an observer to see anything inside. Although this provides for all round surveillance without persons knowing whether or not they are in the field of view, the deterrent effect of what appears as just a shiny suspended dome is not so great as that of a housing which proclaims aloud the fact that it is watching. For the management of stores, the prime objective is deterrence of would-be thieves; detection and prosecution of actual thieves is the second priority.

OBJECT OF THE INVENTION

It is therefore an object of the invention to maximize the deterrent effect while at the same time giving great flexibility of surveillance.

SUMMARY OF THE INVENTION

According to the present invention, there is provided surveillance apparatus comprising a camera concealed within a housing which carries externally a plurality of elements having the appearance of viewing lenses. A piece of trim on the housing forms a viewing window for the camera, and means are concealed within the housing for adjusting, under remote control, the viewing axis of the camera to look through different regions of the window.

Also according to the invention there may be a plurality of pieces of trim on a camera housing which are of like appearance and of which at least one forms a viewing window for the camera. The or each piece of trim may be a vertically extending strip, the adjusting means tilting the camera behind the window, for viewing at any elevation within a predetermined range, elevation being used herein to encompass tilts above and below the horizontal.

The invention thus makes use of the decorative trim, which externally has no functional appearance, to give the camera an extended viewing window in place of the single direction viewing aperture of the prior art lens arrangements. However, dummy lenses are still preferably used to draw attention away from the real viewing windows provided by the trim.

The camera is also preferably mounted so that it can pan. For this purpose the housing and the camera may rotate together about a vertical axis so that the camera lens remains at the window, or the housing may be fixed, a plurality of windows may be provided therein, and the camera may pan from one window to another. The addition of the tilt facility to the known pan facility gives complete coverage of the whole region below and around the camera housing, a facility which has previously only been available with systems using non-concealed cameras.

The camera may also readily be provided with a remote controlled zoom lens since the camera views through a window, rather than a lens on the housing forming an element of the camera objective.

The housing may be substantially hemispherical with curved strips of trim extending over its surface from its periphery to its centre. So that the camera objective lens or its orientation shall not be distinguished from outside the housing, the camera, its lens mount, parts within the housing and the inside surface of the housing are preferably all matt black. The trim is preferably very shiny, as may be the whole of the outside of the housing. Even so it may be possible for the careful observer to detect the camera lens through the window and dummy camera lenses may be provided within the housing, to mislead observers in the surveillance zone, especially if more than one strip of trim is a window.

BRIEF DESCRIPTION OF THE DRAWINGS

FIG. 6 shows a modification of FIG. 2.

DETAILED DESCRIPTION

Figure 1:
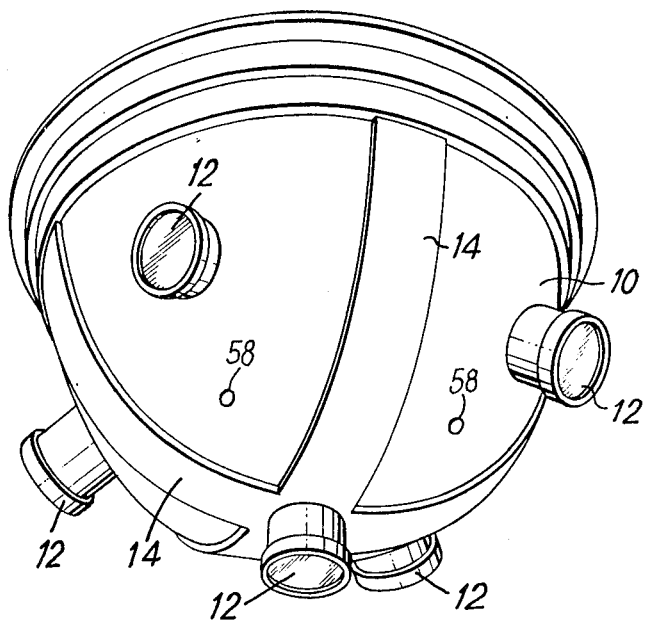
FIG. 1 is an oblique view of a housing from below.
Figure 2:
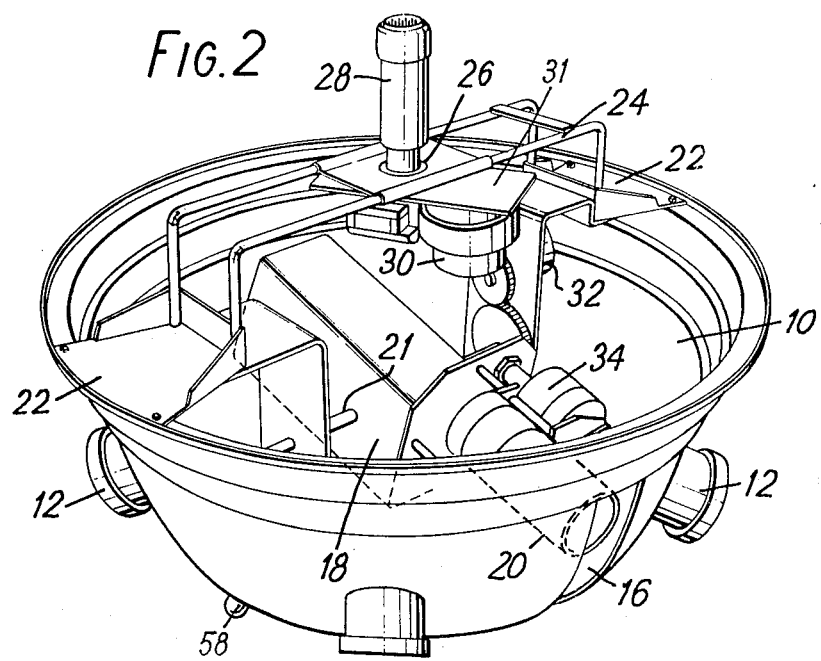
FIG. 2 is an oblique view of the housing from above, showing a camera and other parts.

Referring to FIGS. 1 and 2, a substantially hemispherical housing 10 carries on its outside a number of dummy lenses 12. Curved strips of trim 14 (FIG. 1) are fixed to the housing: one of these strips covers a slot 16 (FIG. 2). Inside the housing 10 is mounted a television camera 18, having a zoom objective lens 20. The camera is pivoted in a cradle about a horizontal axis 21 between brackets 22 which are attached to the rim of the housing 10. Across the top of the housing extends a bridge 24, having a vertical pivot 26 to which is connected a mounting plug 28.

Geared electric motors 30, 32, 34 are provided to pan the camera by rotating the housing 10 about the pivot 26, to tilt the camera about the axis 21, and to zoom the lens 20. These motors are controlled in open loop, and limit switches are provided in a manner known per se to stop or reverse each motor at either limit of its travel.

Figure 3:
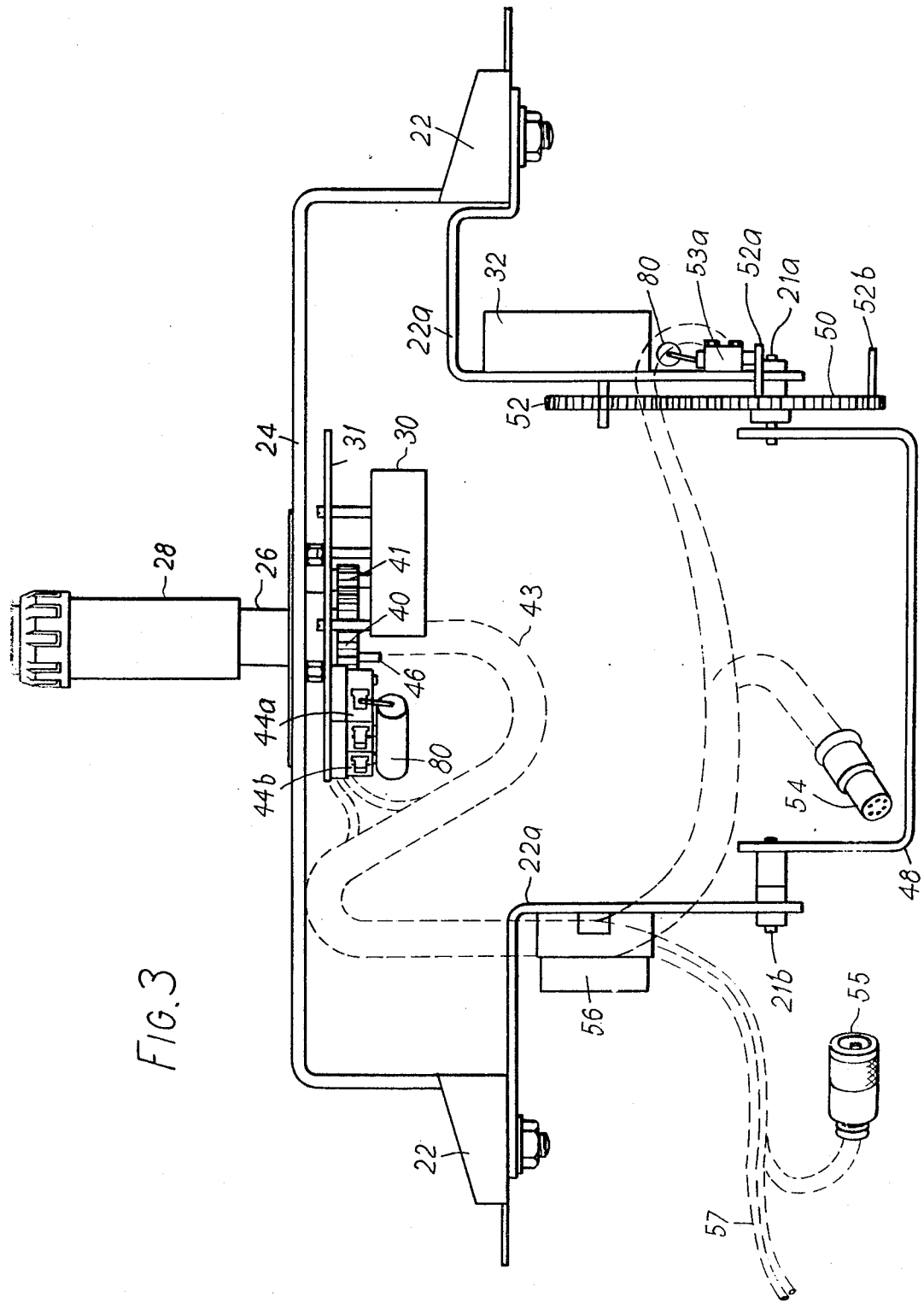
FIG. 3 is an elevation of the apparatus with the housing and camera removed.

Referring to FIG. 3, the lower end of the pivot 26 carries a fixed gear 40 in mesh with an output pinion 41 of the motor 30. This motor is fixed under a rotor plate 31 which is fixed by studs to the bridge 24 and journalled on the pivot 26. When the motor rotates the pinion 41 drives round the gear 40 and the rotor plate 31, bridge 24 and housing 10 rotate. Rotation is not continuous but through 360° in alternate directions. This avoids the need for slip rings and allows electrical connections to be effected by way of a flexible harness 43 which enters through the plug 28 and pivot 26. Two microswitches 44a and 44b are tripped to stop the rotation at the end of each 360° rotation by a pin 46 on the gear 40.

The camera cradle 48 is carried by pivot pins 21a and 21b in two brackets 22a fixed to the brackets 22. A gear 50 is fixed to the cradle 48. The motor 32 is fixed on one of the brackets 22a and has an output pinion 52 in mesh with the gear 50. Rotation of the motor therefore tilts the cradle 48. In the position shown in FIG. 3, the cradle 48 (and camera when mounted thereon) are horizontal and a pin 52a on the gear 50 trips a microswitch 53a to define one limit of tilt. The other limit is with the camera depressed about 60° and is defined by another pin 52b which trips another microswitch 53b (FIG. 5) hidden behind the microswitch 53a in FIG. 3.

The cable harness 43 provides connections to the microswitches and motors, to a plug 54 for the camera lens motors, a coaxial plug 55 for the camera video, a socket 56 for the camera power supply and leads 57 extending to small flashing lights 58 (FIG. 1) provided on the housing in known manner to attract attention thereto.

Figure 4:
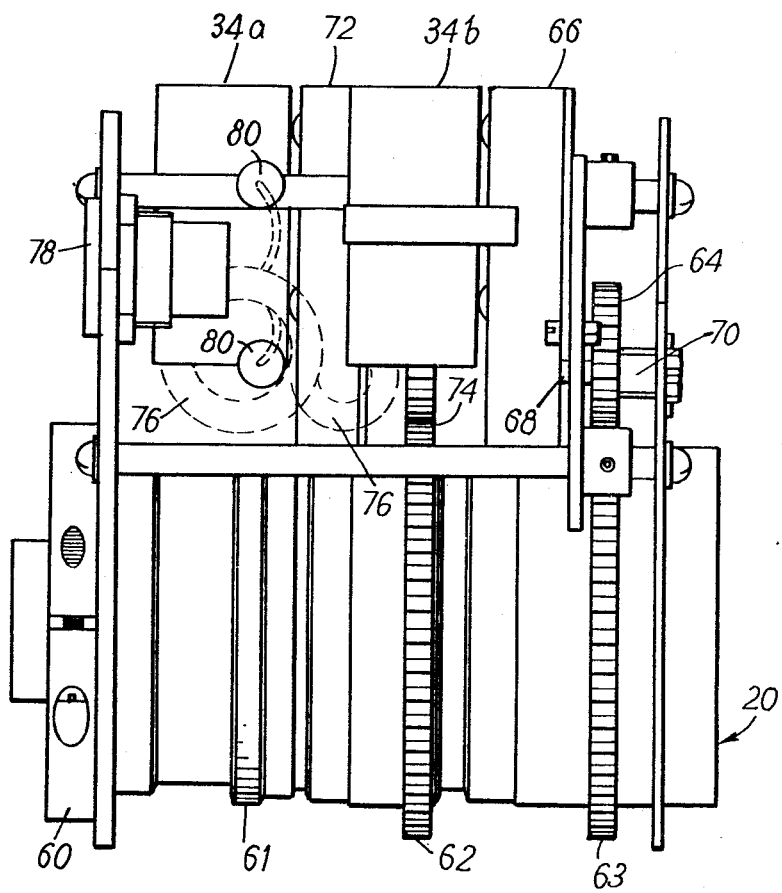
FIG. 4 is an elevation of the camera lens unit.

FIG. 4 shows the camera lens 20 which is a commercially available lens with a collar 60 for clamping on to the front of the camera 18 and rings 61, 62 and 63 for adjusting aperture, zoom and focus respectively. In this embodiment the aperture is merely preset but the rings 62 and 63 are geared for motorized drive. Motors 34a and 34 drive the zoom and focus rings 62 and 63 respectively. Thus motor 34b drives a gear 64 through a reduction gearbox 66 and the gear 64 meshes with the gear ring 63. Limit switches are not provided for the motor 34b but the gear 64 is coupled to its shaft 68 by a conventional friction clutch 70 which slips when the ring 63 reaches either end of its travel.

In a similar manner motor 34a drives the gear 62 through a gearbox 72 and a gear 74. Cables 76 for feeding the motors extend from a socket 78 into which the plug 54 (FIG. 3) is plugged.

Figure 5:
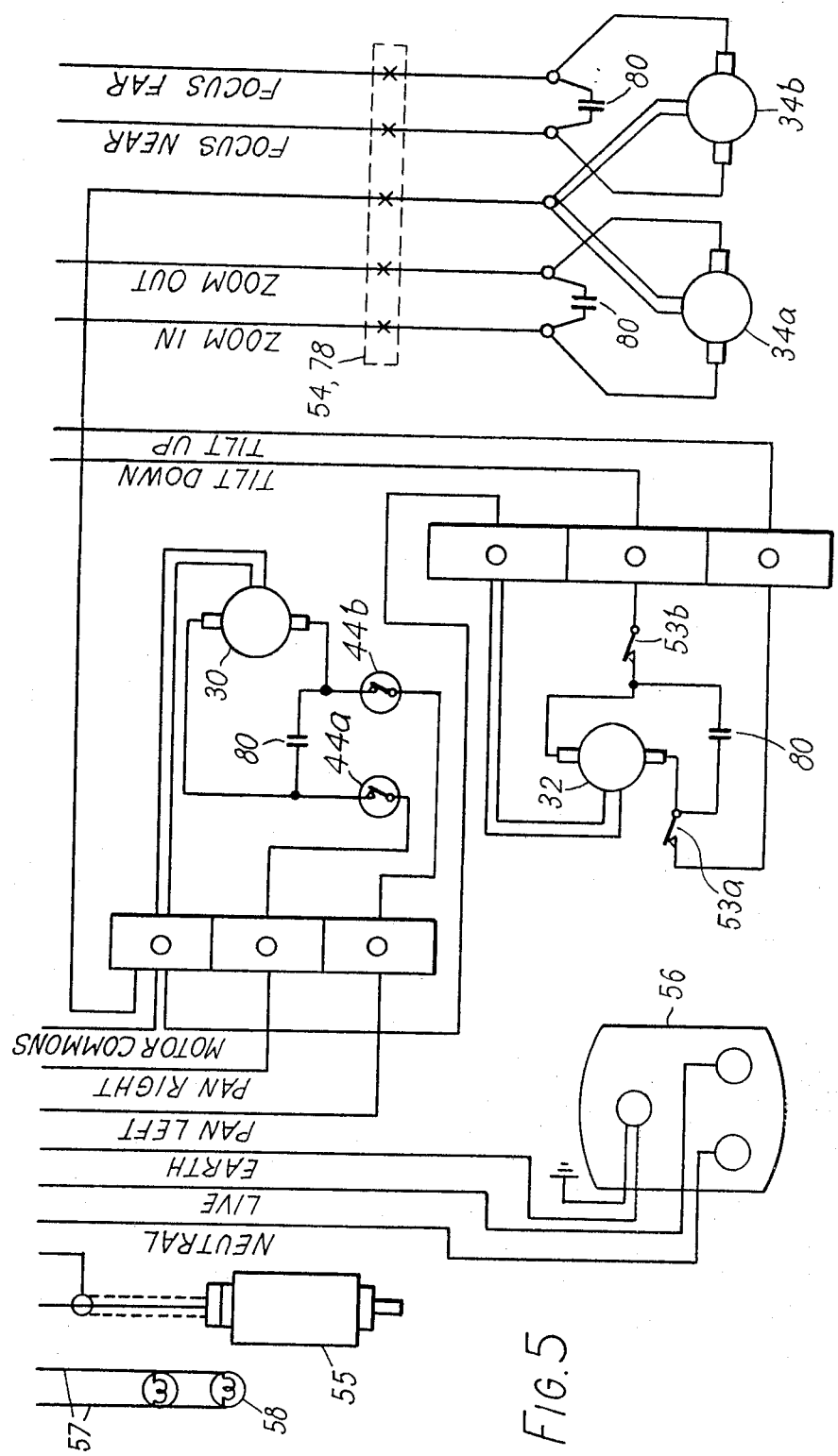
FIG. 5 shows the electrical circuit of the apparatus.

FIG. 5 shows the electrical circuit and reading across the top of the drawing appear all the conductors within the cable harness 43 as follows:

Leads 57 for the flasher lamps 58
Screened lead to the video connector 55
Three mains cores to the camera power plug 56
Pan left and right leads (see below)
Common return for all motors
Tilt down and up leads (see below)
Zoom in and out leads (see below)
Focus near and far leads (see below).

The last two pairs of leads are connected to the motors 34a and 34b via the connector 54, 78. All four motors 30, 32, 34a and 34b are reversible and the direction of rotation is determined by which one of the corresponding pairs of leads (pan, toilt, zoom or focus as the case may be) is energized. These leads may be energized via pushbutton or other manually operable switches at an operator console (not shown). The pan left and right functions are terminated when the pin 46 (FIG. 3) opens the limit switch 44a or 44b respectively. The tilt up operation is terminated when the pin 52a opens the limit switch 53a and the tilt down operation is terminated when the pin 52b opens the limit switch 53b.

FIGS. 3 to 5 also show conventional suppressor capacitors 80.

The surfaces of all parts within the housing except the lens 20 are black, e.g. painted with matt black paint, so that they are difficult to see through the window from outside the housing. The strips of trim are made from a clear, glossy, acrylic plastics material, which may be commercially available cast, acrylic, thermoplastic sheet such as is available under the Trade Names "Plexiglass" and "Lucite." The portions of the surface of the housing 10 behind those strips of trim which are not over the slot 16 are again black, so that the strips all appear alike.

In use, the camera may zoom, tilt about the horizontal axis 21, and pan about the vertical pivot 26. The objective lens 20 remains opposite the slot 16 so that the camera view is uninterrupted. Persons in the surveillance zone may think the camera 18 views through one or more of the dummy lenses 12, whereas in fact it views through one of the strips 14. Because all the strips look alike and the parts within the housing cannot be seen from outside since they are black, persons in the surveillance zone cannot observe the orientation of the camera 18.

As already mentined, the housing can be fixed, the camera panning from window 16 to window 16 thereof. This is a simple modification illustrated in FIG. 6, wherein the bridge 24 which supports the housing is now fixed to the mounting plug 28 while the brackets 22a depend from the rotor plate 31. For simplicity the motors 30 and 32 and other details of FIG. 3 are not repeated in FIG. 6.

We claim:
1. Surveillance apparatus comprising:
 a camera and a housing, said camera being concealed within said housing;
 a plurality of elements having the appearance of viewing lenses carried externally on said housing;

at least one piece of trim on said housing forming at least one viewing window for said camera;

and orientation means within said housing for adjusting, under remote control, the viewing axis of said camera to look through different regions of said window.

2. Apparatus as claimed in claim 1, wherein said piece of trim is a vertically extending strip.

3. Apparatus as claimed in claim 1, wherein said orientation means are operable to tilt said camera behind said window.

4. Apparatus as claimed in claim 1, wherein said camera is mounted for panning movement.

5. Apparatus as claimed in claim 4, wherein said camera and said housing are rotatable together about a vertical axis so that said viewing axis of said camera remains at said window.

6. Apparatus as claimed in claim 4, wherein said housing is fixed, a plurality of said windows are provided in said housing, said camera is rotatable about a vertical axis, and said camera pans from one of said windows to another.

7. Apparatus as claimed in claim 1, wherein said camera has a zoom lens adjustable under remote control.

8. Apparatus as claimed in claim 1, wherein said housing is substantially hemispherical, said piece of trim is curved and extends over the surface of said housing from its periphery to its centre.

9. Apparatus as claimed in claim 1, wherein said camera, parts within said housing, and the inner surface of said housing are matt black.

10. Apparatus as claimed in claim 8, wherein said piece of trim is very shiny.

11. Apparatus as claimed in claim 8, wherein dummy camera lenses are provided within said housing.

12. Surveillance apparatus comprising:

a camera housing and a camera concealed therein;

a plurality of pieces of trim disposed on said housing, all said pieces of trim being of like appearance and at least one of said pieces of trim forming a viewing window for said camera;

and means within said housing for adjusting, under remote control, the viewing direction of said camera to look through different regions of said window.

13. Surveillance apparatus according to claim 12, wherein said pieces of trim are strips extending downwardly over said housing and said adjusting means adjust the elevation of the camera behind said at least one piece of trim.

* * * * *